United States Patent

[11] 3,577,612

| [72] | Inventor | Victor G. Susin<br>834 Santa Maria Drive, Naperville, Ill. 60540 |
|---|---|---|
| [21] | Appl. No. | 763,494 |
| [22] | Filed | Sept. 25, 1968 |
| [45] | Patented | May 4, 1971 |

[54] APPARATUS FOR MAKING MULTI-DUCT CONDUIT
11 Claims, 9 Drawing Figs.

[52] U.S. Cl. ..................................................... 25/41, 249/64
[51] Int. Cl. ..................................................... B28b 7/18, B28b 7/28, B28b 7/06
[50] Field of Search ........................................... 25/41 (J), 41.1, 41.5 (A), 33, 34, 35, 36, 39; 249/63, 64

[56] References Cited
UNITED STATES PATENTS

| 2,303,884 | 12/1942 | Krehbiel et al. | 25/41(J) |
| 2,342,440 | 2/1944 | Whitsitt | 25/41(J) |
| 2,572,830 | 10/1951 | Appleby | 25/41(J) |
| 2,994,119 | 8/1961 | Gagne | 25/33 |
| 3,000,070 | 9/1961 | Gagne | 25/41(J) |
| 3,154,816 | 11/1964 | Harrison et al. | (25/39UX) |
| 3,302,262 | 2/1967 | Chanlund | 25/41(J) |

Primary Examiner—J. Spencer Overholser
Assistant Examiner—R. L. Spicer, Jr.
Attorney—Alter, Weiss & Whitesel ABSTRACT: Improved pressure heads and platens for use in concrete conduit mold assemblies. The heads control flexible platens to make it possible to completely fill the end web sections of the molded conduit and nonetheless obviate concrete flashing.

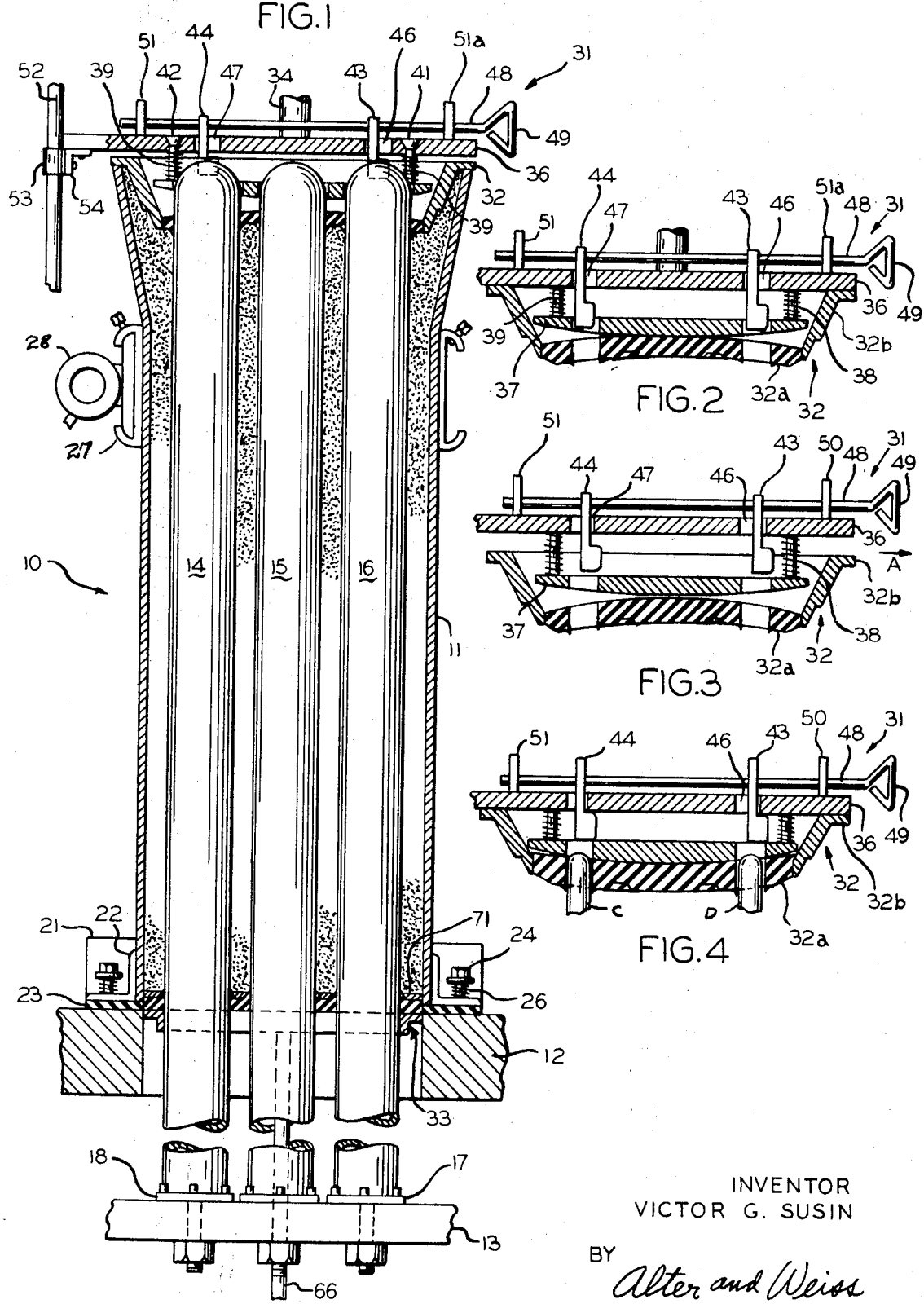

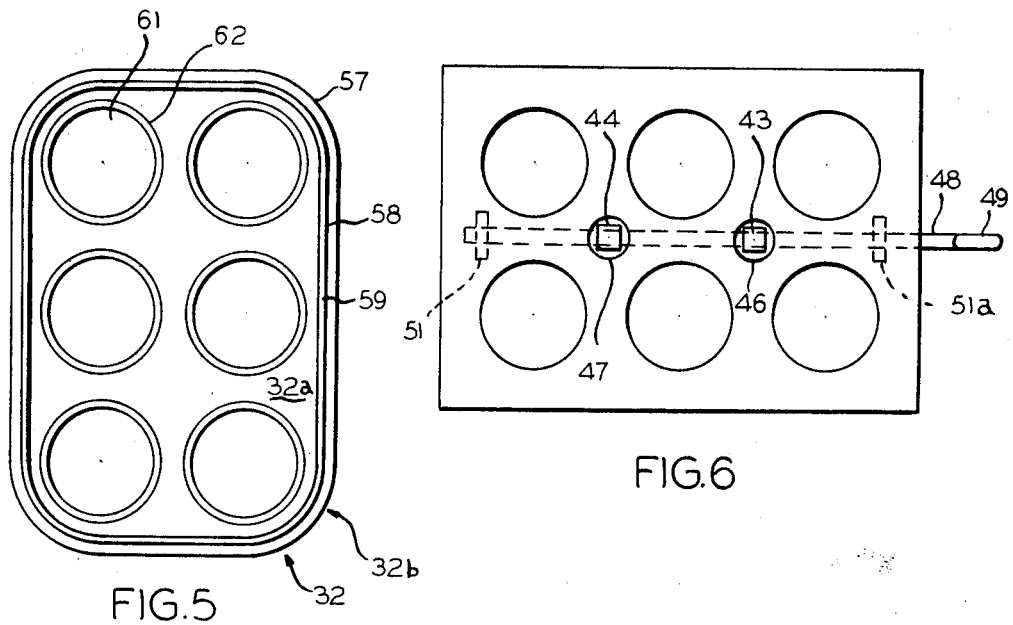
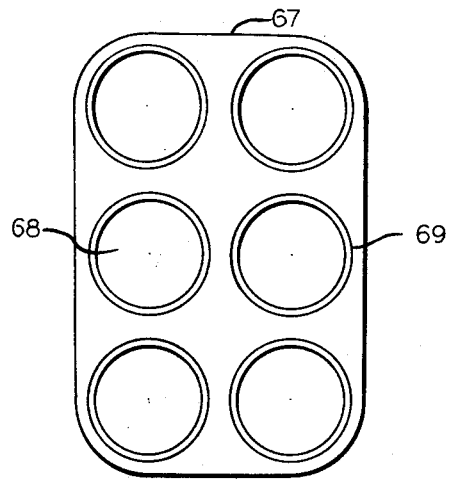
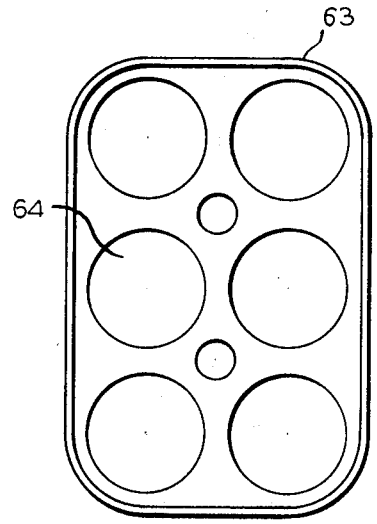
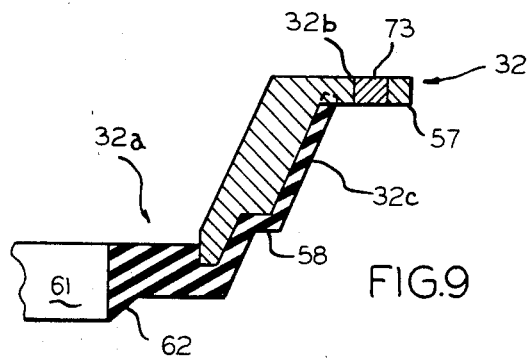

APPARATUS FOR MAKING MULTI-DUCT CONDUIT

This invention relates to molding apparatus for manufacturing multiduct conduit; and more particularly, to improvements in the pressure heads and platens used in such apparatus.

Concrete multiduct conduit finds its major application in use protecting underground cables, such as telephone, telegraph, or power cables. One of the major criteria for such conduit is that the bores and chamfers of the conduit have an absolutely smooth finish, so that it is possible to "snake" long lengths of cable through the conduit without undue friction.

Machines are presently available for molding the concrete multiduct conduit. The molding machines comprise a longitudinal mold which is mounted on a raised deck. A plurality of mandrels extend longitudinally through the mold to provide the multiplicity of ducts. The number of mandrels is varied according to the number of ducts required in a finished piece of conduit. The machines are equipped with a top pressure plate and a bottom pressure plate for use in compacting the concrete being molded. The top pressure plate is moved away to enable the fluid concrete to be poured into the mold. The mandrels, of course, cause the molds to be fabricated with bores or ducts therein for receiving the cabling. After the molds are filled with concrete, the top or bell pressure plate, is placed in position; pressure is applied to the top and bottom, and the mold is vibrated. The vibration of the molds is enhanced by the fact that the molds are made of a pair of longitudinal sections fit together with resilient parts clamped therebetween; thus, amplifying the vibrations and compacting the concrete therein during the hardening thereof. Such a machine, for example, is described in U.S. Pat. No. 3,000,070 which issued on Sept. 19, 1961, and is assigned to Gagne Enterprises, Inc.

One of the difficulties encountered when using the above-described machine is that the top and bottom web sections of the molded multiduct conduit either end up flashed over or with voids at the top, or bell portion, of the webbed section, or the final product may have combinations of these faults. If there is insufficient concrete at the top of the web, then the entire piece must be scrapped. To overcome this fault, it has become the practice and procedure to overfill the mold. This causes an excessive amount of concrete which flashes out around the top and bottom ends of the web sections of the multiduct conduit. The flashing at the bottom is compounded because concrete slurry tends to form or gather at the bottom. The flashing or excessive concrete in the bore must be ground away to provide the smooth finish required to enable long stretches of cabling to be snaked through the conduit.

Accordingly, an object of this invention is to provide improved apparatus for molding multiduct conduit. A related object of this invention is to provide improved pressure heads and platens for use in concrete conduit molding apparatus.

Yet, another object of this invention is to provide flexible platens controlled by pressure heads having a locked and an open condition. In the open condition, the pressure of the cement in the mold causes the resilient platen to assume an upwardly bowed contour. When the pressure head is adjusted to its locked position, the cement is forced downward by the resilient flexible platen that is forced to assume a horizontal contour that is slightly convex. The over abundance of concrete is compacted down into the mold. A special bottom, or lower pressure platen is used to prevent flashing at that end of the conduit.

A further object of this invention is to provide a pressure head having locked and open conditions wherein the change from locked to open position can be made while the pressure head is in place on the mold.

Briefly, an exemplary embodiment of this invention accomplishes these and other objects by means of a bottom pressure plate comprising a casting and cooperating rubber seals attached within the casting. A top, or bell pressure platen, comprises an aluminum bell casting that is preferably rubber covered. The casting forms a peripheral frame for a flexible molded rubber body.

Operating in conjunction with the top pressure platen is a top, or bell pressure head assembly. The pressure head assembly comprises a top plate and a bottom plate parallel to and spaced-apart from each other. The top and bottom plates are maintained in the spaced-apart condition by spring loaded fastening means. Both the top and bottom plates may have apertures therein to enable the mandrels to fit therethrough.

A pair of locking members are attached to a handle fastened to the top surface of the top plate. The locking members are disposed downwardly from the handle and extend through apertures in the top plate. The locking members are L-shaped so that if they are pulled in one direction, the horizontal portion of the L is misaligned with the bottom plate holes through which the locking member extends. The locking members cannot then pass through the bottom plate when they are in the locked position. Thus, the locking members maintain the bottom plate at a fixed distance below the top plate. When the handle is in its normal position, the L-shaped locking members are forced down through the bottom plate holes when sufficient pressure is applied on the bottom plate to overcome the spring loading of the fastener members.

The bell pressure platen fits in the top of the mold, where it is placed in its open condition after the fluid concrete is poured into the mold. Because the body of the bell pressure platen is flexible, it bows upward assuming a concave contour under the pressure of the concrete within the mold during the initial molding stages, as pressure is applied through the upper pressure head and lower pressure platen. Subsequently, pressure is released and the pressure head assembly handle is operated to its locking position. Pressure is reapplied and the bowed-out condition of the upper pressure platen is corrected by the locked bottom plate of the pressure head which abuts the bell pressure platen. Thus, the concrete is forced downward at the upper web section of the conduit. The rubber portion of the upper pressure platen fits securely around the mandrels and thus prevents any excess concrete from seeping therethrough to "flash" onto the ducts. Thus, a perfect top web is obtained. The bottom pressure platen assembly similarly prevents flashing at the bottom web.

The above-mentioned and other features and objects of this invention and the manner of obtaining them will become more apparent and the invention itself will be best understood by reference to the following description of an embodiment of the invention taken in conjunction with the accompanying drawings, wherein:

FIG. 1 is a longitudinal sectional view of the molding apparatus incorporating the inventive bell pressure head assembly, bell pressure platen, and lower pressure platen assembly;

FIG. 2 is a view of the bell pressure head assembly and the upper pressure platen in compaction;

FIG. 3 is a view of the bell pressure head assembly and bell pressure platen in its bowed concave contour with the bell pressure head assembly actuated to its locked position;

FIG. 4 is a view of the bell pressure head assembly in its locked position juxtaposed to the upper pressure platen to maintain it in its normal horizontal or slightly convex contour;

FIG. 5 is a bottom view of the bell pressure platen;

FIG. 6 is a bottom view of the top plate of the bell pressure head assembly;

FIG. 7 is a top view of the molded rubber seal used on the bottom pressure platen assembly;

FIG. 8 is a top view of the casting used in the bottom pressure platen assembly; and FIG. 9 is a partial side sectional view showing details of a preferred upper pressure platen.

Simple and specific terms are used in the following specification, where possible, to facilitate an understanding of the invention. However, it should be understood that the use of these terms are not to coact in any manner as a disclaimer of the full range of equivalence which is normally given under established rules of Patent Law. To illustrate, the attached drawings and description are directed to molding apparatus for concrete, whereas any plastic material which can be molded would suffice; and therefore, the invention is not limited to apparatus for molding concrete material.

Similar characters of reference indicate corresponding parts throughout the several views, and referring now to the same, the character 10 generally indicates presently used molding apparatus having adapted thereto the inventive upper and lower pressure platens and bell pressure head assembly. The molding apparatus 10 comprises the actual mold wall structure 11 which is generally rectangular-shaped, and rests upon a deck or stage 12. A fixed crossmember base 13 is located below the stage 12. Extending upwardly from the fixed crossmember 13 are a plurality of mandrels, such as mandrels 14, 15 and 16. The number of mandrels, of course, corresponds to the number of ducts desired in the conduit. Thus, four, six or nine mandrels are common. It is also now common practice to provide ducts for television cables. These ducts are of smaller diameter than the power cable ducts. It should be noted that the smaller mandrels are shown in FIG. 4 rather than in FIG. 1 to avoid unduly complicating the drawings. Thus, the multiduct conduit generally has ducts therein of different diameters.

Means are provided for fixedly attaching the mandrels to the fixed crossmember base 13. More particularly, each mandrel is shown terminated in a flange, such as flanges 17 and 18. Any well-known fasteners, such as cap screw 19, are provided for fixedly attaching the flanges to the fixed crossmember base 13.

Means are provided for fixedly attaching the mold wall structure 11 to stage 12. More particularly, the mold wall structure 11 terminates at its bottommost section in a plate, such as plate 21. The bottommost section of the wall structure 11 also has attached thereto by any well-known means, such as welding, right angle flanges, such as flange 22. Beneath the flanges and the wall structure, a resilient pad, such as pad 23, is located to aid and amplify the vibration which occurs during the compacting and compressing process the concrete in the mold is subjected to during the molding cycle. A spring loaded bolt is used to fixedly attach the flanges to the stage 12, such as for example, bolt 24 having springs 26.

Means are provided for vibrating the mold during the compression process and thereby compacting the concrete or other plastic material used within the mold. More particularly, brackets, such as bracket 27, are fixedly attached to wall structure 11 of mold apparatus 10. The bracket is designed to hold a vibrator, such as vibrator 28 that causes vibrations within the mass in the mold during the compression cycle of the molding operation.

Means are provided for compressing the concrete within the mold. More particularly, a bell pressure head assembly acts in cooperation with an upper pressure platen to apply downwardly exerted forces to the concrete within the mold. At the same time, a lower pressure platen assembly is provided to apply an upwardly exerted pressure on the plastic concrete within the mold. The bell pressure head assembly is indicated generally as 31. The upper, or bell pressure platen, is indicated generally as 32. The lower pressure platen assembly is indicated generally as 33.

The bell pressure head assembly 31 is used to transmit pressure from a hydraulic device, for example, to the mold section itself. The pressure is applied through a piston 34 which is attached to the top of the bell pressure head assembly.

The bell pressure head assembly comprises means for controlling the contour of the upper pressure platen. In greater detail, the assembly includes a top plate 36 and a parallel downwardly disposed bottom plate 37. The bottom plate 37 is maintained spaced-apart from the upper plate by springs, such as springs 38 and 39, surrounding fasteners, such as bolts 41, 42, respectively, used to attach bottom plate 37 to the upper plate 36.

Means are provided for selectively changing the force exerted on the material within the mold without changing the pressure applied thereto. That is, means are provided for enabling the distance between the upper plate 36 and the bottom plate 37 to be variable or fixed. In greater detail, locking members, such as L-shaped members 43, 44 protrude through apertures 46, 47 in top plate 36. The horizontal section of the L is normally below the bottom of the top plate 36. A horizontal rod 48 terminating in handle 49 is used to move the locking members 43 and 44 in the apertures from the open position to the locked position.

As shown in FIG. 2, in the open position, the L-shaped members are located in alignment with holes 50, 50a in the bottom plate so that they can completely fit into the holes. In the locked position, as shown in FIGS. 3, 4, the L-shaped members are located out of alignment with the apertures and with the holes so that the top horizontal portion of the L-shaped members is contiguous to the bottom surface of the top plate 36, and the bottom horizontal portion of the L-shaped members is contiguous to the top surface of plate 37. Then the horizontal portion of the locking members cannot pass through the holes 50, 50a or the apertures 46 and 47.

The handle rod 48 is slidably attached to the top plate 38, in any well-known manner by brackets 50 and 51 located on the top of the top plate, and is fixedly attached to L-shaped members 43, 44 in any well-known manner. Alternative locking means may be provided within the scope of this invention. For example, slots could be provided in members 51, 51a to enable the rod to move up and down in the brackets, to provide the open condition rather than holes in the bottom plate.

The bottom plate 37 is shaped to cooperatively fit over and be contiguous to the rubber portion 32a of bell pressure platen 32.

The upper pressure head assembly is moved by actuation of piston rod 34 by a two way actuator, (not shown) and slides along a guide rod 52. A clamp 53 slidably engages the guide rod and a bracket 54 couples the clamp to the upper pressure head assembly 31.

The cooperation of the upper pressure head 31 and upper pressure platen 32 is best illustrated in FIGS. 2, 3 and 4. FIG. 2 shows the upper pressure head 31 in its open position when pressure is being applied to the bottom and top pressure platens and the concrete within the mold is being compressed and compacted. Then, because of the pressure applied by the concrete within the mold, the flexible or rubber portion 32a of the upper pressure head 32 is forced into a contour that is bowed upwardly and abuts the bottom plate 37 of the upper pressure head 31. The bottom plate of the upper pressure head is forced against the force of springs 38 and 39. The locking members do not function at this time since they fit into holes 50, 50a.

Near the end of the compression cycle, pressure on the cylinders applying the pressure to the upper and lower pressure heads is released, as shown in FIG. 3. Then handle rod 48 is moved in the direction of arrow A to move locking members 43 and 44 to their locked position. At this time the pressures of cement still causes the flexible or rubber portion 32a of the bell pressure platen 32 to assume an upwardly bowed contour.

Pressure is reapplied as shown in FIG. 4 and the lower plate 37 of the upper pressure head 31, juxtaposed to flexible section 32a by the force applied through locking members 43, 44 forces the bottom of section 32a to assume a straight line or preferably a slightly convex contour. Whenever pressure is applied through piston 34, it forces plate 36 into contiguous relationship with peripheral section 32b of platen 32, maintaining platen 32 firmly in the mold. TV mandrels c and d are illustrated in FIG. 4.

It should be noted, that ideally the under surface of lower plate 37 may be slightly thicker at its middle portion than at its ends; that it is convex or downwardly arcuately shaped. Thus, in the locked position, it causes the flexible bowed convex contour.

The bottom view of the bell pressure platen 32 is shown in FIG. 5. Therein, the peripheral section 32b is shown as having a bell shape. That is, there is an outer rim portion 57 which fits onto the mold wall structure 11. The stepped portions 58 and 59 may be provided to provide a negative of the steps in the multiduct concrete conduit to facilitate the removal of platen 32. The rubber portion 32a may be vulcanized directly to the peripheral section or frame 32b and fits into the shallow disclike shape of the upper pressure plate frame 32b. Apertures are provided in the upper pressure platen, such as aperture 61, to enable the mandrels to pass therethrough, and to seal the concrete within the mold to prevent it from passing around the mandrels into the ducts. Thus, there is a tight fit between the rubber section 32b and the mandrels. Also, the rubber section surrounding the apertures is shaped to give a bevel edge to the duct portion of the multiduct concrete conduit. This is illustrated by the double line 62 defining the hole 61, and is also seen in the shape of the sectional views of platen 32.

The smaller holes for the TV cable mandrels are not shown in FIGS. 5 and 7. They are preferably and usually centrally located between the larger cable mandrel holes, however, they may be located wherever convenient and the locking members moved to maintain the alignment. The fact that holes may be located as convenient is emphasized in FIG. 1—4 wherein the locking members and holes are shown located other than centrally between the larger mandrels. The important thing is that the locking members are located to apply proper pressure to the bottom plate to keep it from tilting.

As best seen in FIG. 6, the apertures 46 and 47 through which the locking members pass are preferably round-shaped. They could, however, be square-shaped. The essential criteria is that the bottom of the locking member cannot pass through the aperture in its locked position, that is when the handle rod 48 is moved until the locking members are no longer aligned with apertures in the top plate and the holes in the bottom plate.

Means are provided for preventing "flashing" at the lower web section of the conduit. In greater detail, FIGS. 7 and 8 show the base pressure plate and the resilient pad that comprise the lower pressure platen assembly 33. The base pressure plate 63 may be a bronze casting in the shape of a shallow disc having apertures therein, such as aperture 64, to enable the mandrels to pass therethrough. A piston 66, which is operated by a two-way actuator, (not shown) is attached to the base pressure plate in any well-known manner. The base pressure plate may also have ribs (not shown) on the underside thereof to further strengthen the base pressure plate.

The rubber pad 67, is designed to fit into the base pressure plate. It may be firmly attached thereto by vulcanizing or preferably by gluing with an epoxy. The rubber pad 67 also has holes or apertures therein, such as hole 68, conforming to the holes in the base pressure plate. The holes, such as hole 68, are sized so that they conform precisely with the outer diameter of the mandrel, to thereby seal the concrete and prevent it from escaping around the rubber and causing what is generally termed as "flashing," that is excessive concrete on the inside bores which must naturally be ground off to provide the smooth finish required. The rubber pad 67 slants up to the top edge of the holes, shown by double lines 69, to thereby form a beveled edge to the bore of the ducts in the completed multiduct conduit.

A transfer platen 71 may be provided over the top of bottom pressure platen 33. The transfer platen is used to protect the bottom of the conduit during in-plant handling.

The preferred upper pressure platen 32 shown in FIG. 10 comprises the aluminum frame section 32b which is bell-shaped. That is, outer peripheral steps are provided to properly shape the duct entrances in the finished concrete conduit. The preferred upper pressure platen of FIG. 10 shows the rubber of portion 32a extending along the outer periphery of the aluminum frame 32b as shown at 32c. The extension of the rubber among other things eliminates the necessity for finish grinding the aluminum frame.

Means are provided for reinforcing the frame at excessive wear points. More particularly, wear buttons, such as steel wear button 73 is provided on rim section 57. The buttons are aligned with reinforcing bars that are placed in the mold to reinforce the finished product.

In operation, the pressure head and the bell plate are removed from the top of the mold, and concrete slurry is poured in around the mandrels. Then the upper pressure head and upper pressure platen are positioned on the mold. Pressure is applied through pistons 34 and 59, and vibrator 28 is turned on to vibrate the concrete being compacted. It is at this time that the top pressure platen flexes to assume its outwardly bowed shape.

During the last few seconds of the molding cycle, the pressure is released and handle 48 is pulled in the direction of arrow A of FIG. 3 to put the upper pressure head in its locked position. Pressure is reapplied forcing the upper pressure plate to flex downward to force the concrete downward to its straight horizontal position. This causes a flat or slightly downwardly bowed upper web section on the conduit with a minimum or no excessive concrete.

In addition, the bottom pressure plate with its rubber seal prevents any flashing at the bottom end of the molded conduit. Thus, the necessity for arduously removing excessive concrete is obviated. Also, because of the inventive arrangement, voids are no longer a problem. After molding is completed, the upper pressure head is removed and the conduit is lifted from the mold and prepared for shipment.

While I have described the above principals of my invention in connection with specific apparatus, it is to be clearly understood that this description is made only by way of example and not as a limitation on the scope of my invention.

I claim:

1. Mold apparatus for fabricating multiduct conduit having smooth inside bores, said mold apparatus comprising:
   a mold structure,
   mandrel means extending longitudinally within said mold wall structure,
   said mold wall structure having a top bell section and a lower section,
   lower pressure platen means for applying pressure to the material within the mold at the lower section,
   an upper pressure applying assembly for applying pressure to said material at the top bell section, and
   said upper pressure applying assembly comprising means for selectively mechanically changing the force exerted on the material within the mold with the same pressure being applied.

2. The apparatus of claim 1 wherein said upper pressure assembly comprises a bell pressure platen and a cooperating bell pressure head.

3. The apparatus of claim 2 wherein said bell pressure platen comprises a peripheral frame, and flexible body means attached to said peripheral frame.

4. Mold apparatus for fabricating multiduct conduit having smooth inside bores, said mold apparatus comprising:
   a mold wall structure,
   mandrel means extending longitudinally within said mold wall structure,
   said mold wall structure having a top bell section and a lower section,
   lower pressure platen means for applying pressure to the material within the mold at the lower section,
   an upper pressure applying assembly for applying pressure to said material at the top bell section,
   said upper pressure assembly comprising a bell pressure platen and a cooperating bell pressure head,
   said bell pressure platen comprising a peripheral frame,
   flexible body means attached to said peripheral frame,
   said flexible body means comprising molded rubber,
   said molded rubber means having apertures therein conforming to the shape of said mandrel means, and
   said upper pressure applying assembly further comprising means for mechanically varying the force due to the pressure applied.

5. The apparatus of claim 4 wherein said peripheral frame comprises a horizontal section and a vertical section and means for extending said flexible body along the outside of said vertical section.

6. Mold apparatus for fabricating multiduct conduit having smooth inside bores, said mold comprising:
a mold wall structure,
mandrel means extending longitudinally within said mold wall structure,
said mold wall structure having a top bell section and a lower section,
lower pressure plate means for applying pressure to the material within the mold at the lower section,
an upper pressure applying assembly for applying pressure to said material at the top bell section,
said upper pressure assembly comprising a bell pressure platen and a cooperating bell pressure head,
said bell pressure platen comprising a peripheral frame,
flexible body means attached to said peripheral frame,
said bell pressure head comprising a top plate,
pressure piston means attached to said top plate for applying pressure thereto,
a bottom plate movably attached to said top plate,
resilient means for maintaining said top and bottom plates spaced-apart but enabling said space to vary under pressure,
said bottom plate shaped to fit contiguously within said flexible body means for applying pressure thereto, and
locking means for selectively maintaining a fixed minimum distance between said top and bottom plates even under pressure.

7. The apparatus of claim 6 wherein said locking means comprises at least one locking member normally situated between said top and bottom plates,
means for causing said at least one locking member to be jammed between said top and bottom plates when pressure is applied to said top plate, and
handle means attached to said at least one locking member to remove said at least one locking means from said jammed condition to thereby enable said flexible body means to force said bottom plate closer to said top plate than said fixed minimum distance.

8. The apparatus of claim 7 wherein said at least one locking member is an L-shaped member,
aperture means in said top plate,
said L-shaped member normally aligned with said aperture means, and
wherein said handle means can be operated to move said L-shaped members out of alignment with said aperture means whereby the horizontal part of said L-shaped member jams between said top and bottom plates when pressure is applied through said piston thereby forcing said flexible body means to assume a substantially horizontal contour.

9. The apparatus of claim 8 wherein said lower surface of said bottom plate is slightly convex, and the flexible body means is forced to a slightly concave contour.

10. Mold apparatus for fabricating multiduct conduit having smooth inside bores, said mold apparatus comprising:
a mold wall structure,
mandrel means extending longitudinally within said mold wall structure,
said mold wall structure having a top bell section and a lower section,
lower pressure plate means for applying pressure to the material within the mold at the lower section, an upper pressure applying assembly for applying pressure to said material at the top bell section,
said upper pressure applying section comprising means for mechanically varying the force due to the pressure applied,
said lower pressure plate comprising a metallic disc-shaped plate having apertures therein to enable said mandrel to fit therethrough,
rubber pad means fixedly attached within said disc-shaped plate, aperture in said rubber pads coaxial with said plate apertures, and
said pad apertures designed to press fit around said mandrels.

11. The apparatus of claim 10 wherein said pad apertures are designed to provide bevels at the openings of said ducts.